United States Patent [19]

Yagura et al.

[11] 4,446,410

[45] May 1, 1984

[54] CONTROL CIRCUIT FOR A SOLENOID-OPERATED ACTUATOR

[75] Inventors: Toshiaki Yagura; Kenichiro Satoyama, both of Kariya; Kazutoshi Morisada, Obu; Ryoichi Yamamoto, Aichi; Seietsu Yoshida, Kariya, all of Japan

[73] Assignee: Nippondenso Co., Ltd., Kariya, Japan

[21] Appl. No.: 341,502

[22] Filed: Jan. 21, 1982

[30] Foreign Application Priority Data

Jan. 22, 1981 [JP] Japan .................................. 56-8164

[51] Int. Cl.³ .............................................. G05B 11/00
[52] U.S. Cl. .................................... 318/687; 318/135; 318/678; 361/152
[58] Field of Search .................. 318/135, 687, 678, ; 361/152, 154, 187

[56] References Cited

U.S. PATENT DOCUMENTS

| | | | |
|---|---|---|---|
| 3,549,966 | 7/1969 | Wilson | 318/135 |
| 4,150,643 | 4/1979 | Sasayama et al. | 123/119 EC |
| 4,184,090 | 4/1979 | Kawa et al. | 361/154 X |
| 4,214,290 | 7/1980 | Sloan | 361/187 X |
| 4,216,938 | 8/1980 | Inada et al. | 251/65 |
| 4,345,296 | 8/1982 | Breitling | 361/154 |
| 4,377,144 | 3/1983 | Takahashi | 361/152 |

*Primary Examiner*—B. Dobeck
*Attorney, Agent, or Firm*—Cushman, Darby & Cushman

[57] ABSTRACT

A control circuit comprises a switching element connected in series with the coil of an actuator for generating a drive current when rendered conductive. A drive current sensing resistor is coupled in a circuit with the switching element and the coil to develop a first voltage in response to the switching element being rendered conductive. A surge current sensing resistor is coupled in a circuit with the coil through a unidirectionally conducting element to develop a second voltage in response to the switching element being rendered non-conductive. The first and second voltage are amplified and fed to a differential integrator to which an actuator control signal is also applied. The output of the differential integrator is compared with the instantaneous value of a ramp voltage to generate gating pulses applied to the switching element.

8 Claims, 8 Drawing Figures

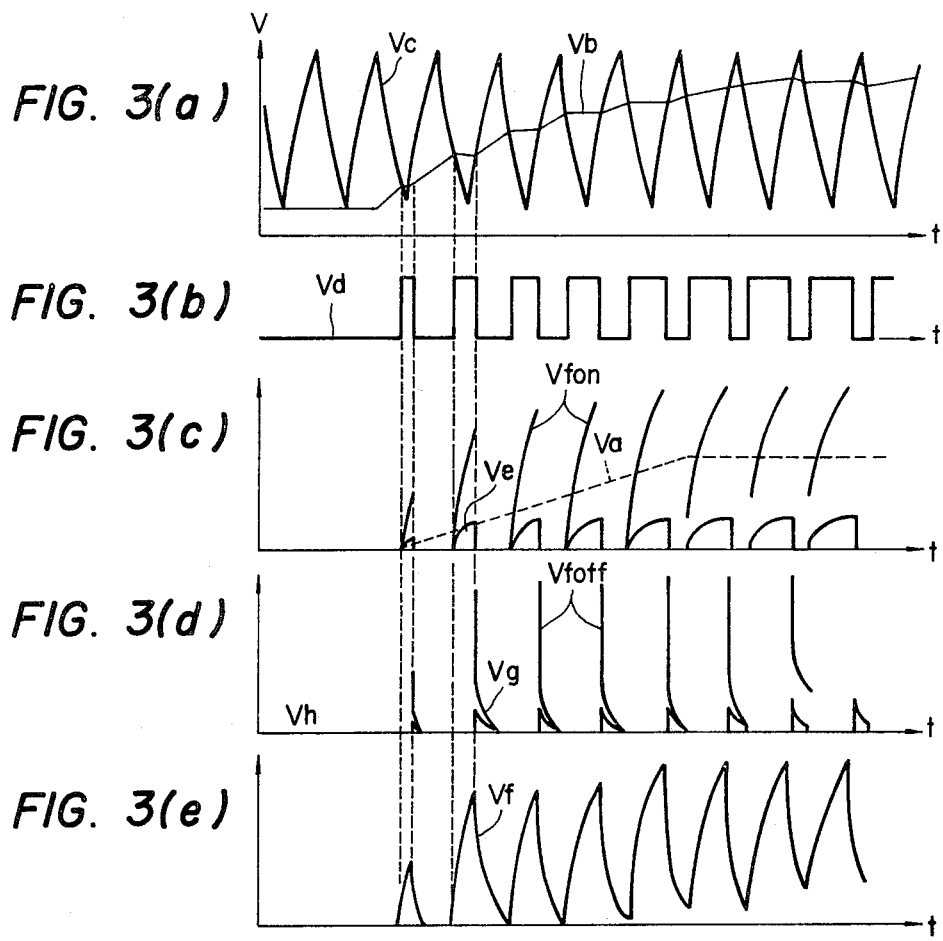
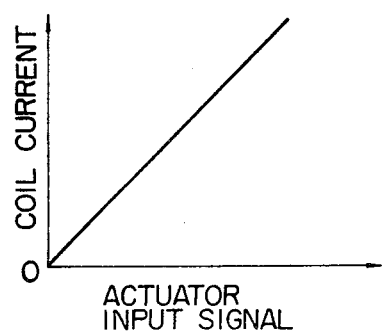

CONTROL CIRCUIT FOR A SOLENOID-OPERATED ACTUATOR

BACKGROUND OF THE INVENTION

The present invention relates to a control circuit for controlling a solenoid-operated actuator in a closed loop in response to a current that drives the actuator. The invention is particularly suitable for fluid-regulated systems in a wide range of automotive applications.

Conventional actuator control circuits comprise a switching element connected in series with the solenoid coil of the actuator and arranged to response to an electrical pulse by generating a drive current in the coil. The switching element is connected in parallel with a Zener diode and further connected in series with a resistor through which the drive current is drained. When the switching element is turned off, surge current is generated which flows through the Zener diode and the resistor. The voltage developed across the resistor is compared with a control signal to derive the switching control pulse. Shortcomings inherent in the prior art control circuit are the production of excessive heat in the Zener diode due to the heavy surge current and the difficulty in providing resistances appropriate for detection of drive and surge currents to generate feedback control signals.

SUMMARY OF THE INVENTION

According to the invention the prior art problems are eliminated by the use of separate resistors for detecting drive and surge currents which are successively generated in a solenoid-operated actuator coil in response to the switching action of a switching element connected in series with the coil.

The separate resistors comprise a drive current sensing resistor which is coupled in a circuit with the switching element and the coil to develop a first voltage signal in response to the switching element being rendered conductive and a surge current sensing resistor which is coupled in a circuit with the coil through a unidirectionally conducting element to develop a second voltage signal in response to the switching element being rendered nonconductive. A pulse generator is responsive to the first and second voltage signals and to an input actuator control signal for generating gating pulses for application to the switching element.

In a specific aspect of the invention, the pulse generator comprises a differential amplifier for amplifying voltages respectively developed across the drive and surge current sensing resistors, and a differential integrator having a first input responsive to the actuator control signal and a second input responsive to the amplified voltage. The output of the differential integrator is compared with the instantaneous value of a ramp voltage to generate a gating pulse for application to the switching element.

Preferably, the differential amplifier includes a first voltage dividing network through which one end of the surge current sensing resistor is coupled to ground for applying a divided voltage to a first input of the differential amplifier, and a second voltage dividing network through which the other end of the surge current sensing resistor is coupled to the output of the differential amplifier for applying a divided voltage to a second input of the differential amplifier. Each of the first and second voltage dividing networks includes a first resistor of identical value and a second resistor of identical value connected in a series circuit. The drive current sensing resistor is coupled at one end thereof through a third resistor to the first input of the differential amplifier and coupled at the other end thereof through a fourth resistor to the second input of the differential amplifier, the third and fourth resistors having equal resistance value. The ratio of resistance value of the drive current sensing resistor to the fourth resistor is equal to the ratio of resistance value of the surge current sensing resistor to the first resistor of the second voltage dividing network.

BRIEF DESCRIPTION OF THE DRAWINGS

The invention will be described in further detail with reference to the accompanying drawings, in which:

FIGS. 3a to 3e are illustrations of waveforms appearing in the circuit of FIG. 2; and FIG. 4 is a graphic illustration of the operating characteristic of the invention.

DETAILED DESCRIPTION

Figure 1:
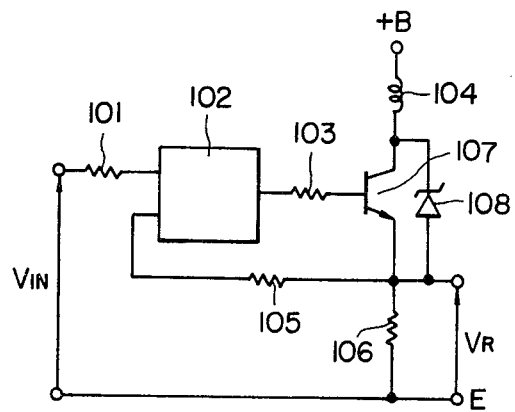
FIG. 1 is a circuit diagram of the prior art control circuit.

Before proceeding to a description of the present invention, it is appropriate to describe the prior art feedback controlled valve control circuit of FIG. 1 as a typical example. In the prior art circuit, the coil 104 of a linear solenoid-operated valve is connected at one end to a voltage source +B with its other end being coupled through the collector-emitter path of a switching transistor 107 in series with a resistor 106 to a ground terminal E. A valve control voltage Vin is applied through am input resistor 101 to a control circuit 102 to which a voltage Vr developed across the resistor 106 is coupled through a resistor 105. The control circuit 102 develops control pulses with a duty ratio which is a function of the difference between the two input voltages. The transistor 107 responds to the control pulse applied to its base by switching into a conductive state allowing a current to pass through the coil 104 and resistor 106. A Zener diode 108, having a breakdown voltage higher than the source voltage +B, is coupled across the collector and emitter of the transistor so that a surge current which develops when the transistor is subsequently turned off, may find a low impedance path developing a high voltage across the resistor 106.

However, due to the large current the Zener diode tends to be heated considerably thus shortening its usable lifetime. Furthermore, the prior art circuit has contradictory factors in that the resistor 106 must be low enough to detect the driving current while it must be sufficiently high to suppress the surge current.

Figure 2:
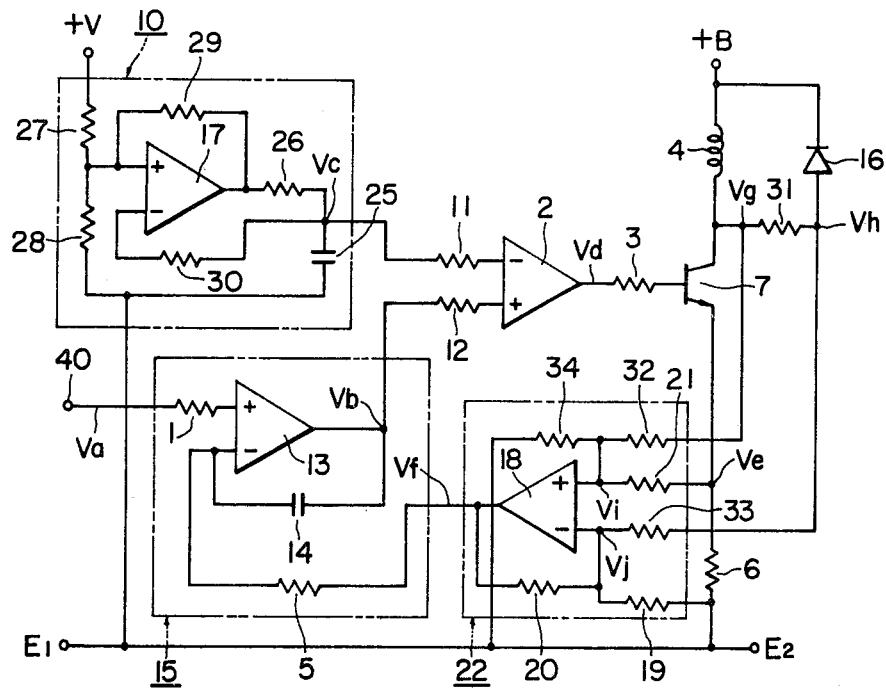
FIG. 2 is a circuit diagram of the control circuit of the present invention.

Referring now to FIG. 2, there is shown a preferred embodiment of the control circuit of the present invention which controls a solenoid valve. This solenoid valve is of a linear proportional type in which the valve opening is continuously variable as a function of the displacement of the solenoid's moving core. The control circuit generally comprises a differential integrator 15, a ramp generator 10, a comparator 2, and a differential amplifier 22. A coil 4 of the solenoid valve is connected at one end to the voltage source +B, the other end of which is coupled to a ground terminal E2 through a first series circuit including the collector-emitter path of a switching transistor 7 and a drive-current sensing resistor 6. The coil 4 is connected in parallel with a second circuit including a surge-current sensing resistor 31 and a diode 16. A circuit junction between coil 4 and resistor 31 is coupled through a first voltage divider formed by resistors 32 and 34 to ground terminal E2, the junction between resistors 32 and 34 being coupled to the noninverting input of an operational amplifier 18 of the differential amplifier 22 to apply thereto a reduced surge-current induced voltage. A circuit junction between resistor 31 and diode 16 is coupled through a second voltage divider formed by resistors 33 and 20 to the output of operational amplifier 18. The junction between resistors 33 and 20 is coupled to the inverting input of the operational amplifier 18 to apply thereto a reduced surged-current induced voltage to generate an amplified surge-current induced voltage. A circuit junction between the emitter of transistor 7 and resistor 6 is coupled by a resistor 21 to the noninverting input of the operational amplifier 18, the other end of resistor 6 being coupled by a resistor 19 to the inverting input of the operational amplifier 18. The amplification gain of the differential amplifier 22 is determined by the relative values of the resistors 19, 20 and 33. The ramp generator 10 is formed by an operational amplifier 17 the noninverting input of which is coupled to a junction of a voltage divider including resistors 27 and 28 series connected between a voltage source at +V and a ground terminal E1. The inverting input of operational amplifier 17 is coupled by a resistor 30 to a time constant circuit formed by a resistor 26 and a capacitor 25 which are connected in series between the output of amplifier 17 and ground terminal E1 to generate a ramp voltage, either triangular or sawtooth. A feedback resistor 29, coupled between the output of amplifier 17 and its noninverting input, and the resistors 27 and 28 are proportioned so that the ramp voltage has an appropriate peak-to-peak value. The output of the ramp generator 10 is taken from a circuit junction "c" between resistor 26 and capacitor 25 and connected through an input resistor 11 to the inverting input of the comparator 2 which also receives an output from a differential integrator 15 via input resistor 12. The comparator 2 is driven into a high voltage output stage when the differential integrator output is higher than the instantaneous value of the ramp voltage thus generating a pulse which is applied through an impedance matching resistor 3 to the base of transistor 7.

The differential integrator 15 includes an operational amplifier 13 having its noninverting input coupled by resistor 1 to an input terminal 40 to which the valve control signal is applied and having its inverting input coupled by an integrating capacitor 14 to the output terminal of amplifier 13 and by an integrating resistor 5 to the output of the differential amplifier 22.

The operation of the circuit of FIG. 2 will be visualized with reference to FIGS. 3a to 3e. The transistor 7 is turned on in response to the output Vd of comparator 2 being driven to a high voltage level (see FIG. 3b). Drive current is generated in the coil 4 developing a voltage Ve across the drive-current sensing resistor 6 as shown in FIG. 3c which is amplified by the operational amplifier 18. An amplified voltage Vf is presented to the inverting input of the differential integrator 15 which in turn provides a differential output representative of the difference between the voltage signal applied from the differential amplifier 22 and the value control signal Va applied to the input terminal 40 and integrates the differential output with respect to time. Assume that the control signal Va varies as shown in FIG. 3c, the integrated differential output will appear as shown at Vb in FIG. 3a. The integrated differential output Vb is compared with the instantaneous value of the triangular wave voltage Vc (FIG. 3a) in the comparator 2 producing a train of gating control pulses Vd of which the duty ratio varies as a function of the integrated differential signal Vb (see FIG. 3b). More specifically, when the integrated differential signal is greater than the instantaneous value of the ramp voltage, the switching transistor 7 is turned on to produce a drive current which flows through the coil 4 and resistor 6 and when the voltage relation is reversed the transistor 7 is turned off producing a surge current which flows through resistor 31 and diode 16. As a result the junction between the coil 4 and resistor 31 develops a surge voltage Vg as shown in FIG. 3d and this voltage is divided by resistors 32 and 34 and applied to the noninverting input of the operational amplifier 18. In addition, the junction between resistor 31 and the anode terminal of diode 16 develops a voltage Vh which is divided by resistors 33 and 20 and applied to the inverting input of the operational amplifier 18. The output of the amplifier 22 can be quantitatively analyzed as follows:

$$\frac{Vi}{R34} = \frac{Vg - Vi}{R32} + \frac{Ve - Vi}{R21} \quad (1)$$

$$\frac{Vf - Vj}{R20} + \frac{Vh - Vj}{R33} = \frac{Vj}{R19} \quad (2)$$

where, Vi and Vj represent the voltages applied to the noninverting and inverting input terminals of the operational amplifier 18, respectively, and R19, R20, R21, R32, R33 and R34 represent the resistance values of resistors 19, 20, 21, 32, 33 and 34, respectively.

Assuming that if R21=R19, R32=R33 and R34 R20 and Vi=Vj exist, the following relation can be derived from Equations (1) and (2):

$$Vf = \frac{R20}{R19} Ve + \frac{R20}{R33} (Vg - Vh) \quad (3)$$

Since the voltage Ve appears across the drive-current sensing resistor 6 during the on-state of transistor 7 and the voltage (Vg−Vh) appears across the surge-current sensing resistor 31 during the off-state of transistor 7, the following relations hold:

$$Ve = I1 \times R6 \quad (4)$$

$$Vg - Vh = I2 \times R31 \quad (5)$$

where R6 and R31 are the resistance values of current sensing resistors 6 and 31, respectively. Let Vfon represent the voltage Vf which occurs during the on-state of transistor 7. Since Vg−Vh=0 when transistor 7 is conductive, Equations (3) and (4) can be rewritten as $$Vfon = \frac{R20}{R19} Ve = \frac{R20}{R19} R6 \times I1 \quad (6)$$

Let Vfoff denote the voltage Vf which develops during the off state of transistor 7. Since Ve=0 during this period, the following relation is derived from Equations (3) and (5):

$$Vfoff = \frac{R20}{R33}(Vg - Vh) = \frac{R20}{R33} R21 \times I2 \qquad (7)$$

Since I1=I2 at the instant the transistor 7 switches from the on-state to the off-state, a relation Vfon=Vfoff is established by satisfying a relation (R6/R19)=(R31/R33). As a result, the transition of voltage Vfon to voltage Vfoff occurs exactly in coincidence with the transistor 7 being turned off as illustrated in FIG. 3e. Due to the averaging effect of the differential integrator 15, the voltage Vb is a time-integral, or average value of Va−Vf. When the instantaneous value of voltage Vf is lower than Va, the voltage Vb and hence the turn-on time of transistor 7 increases causing the coil drive current to increase. In this way the coil 4 is supplied with a current which is proportional to the input voltage Va.

The provision of amplifier 22 that amplifies the voltage developed in the drive-current sensing resistor 6 keeps its resistance value to a minimum while ensuring a sufficient current to the coil 4. Furthermore, due to the separation of functions between surge current detection and drive current detection, the surge current sensing resistor 31 can be appropriately proportioned independently of the drive-current sensing resistor 6 only in relation to the voltage dividing network provided that the latter assures a sufficient voltage level to operate the differential amplifier 22.

If the ground terminals E1 and E2 are interconnected by a conductor of substantial length, a large potential difference is likely to occur between the terminals E1 and E2 due to a large current passing through that conductor. However, by the use of a short length conductor between resistors 6 and 19, the differential amplifier 22 cancels out errors which might result from such potential difference. This serves to render the drive circuit act precisely proportional to the actuator control signal as illustrated in FIG. 4.

What is claimed is:

1. A control circuit for controlling a solenoid-operated actuator having a coil in response to a control signal, comprising:
    a switching element connected in series with said coil for generating a drive current in said coil when rendered conductive;
    a drive current sensing resistor coupled in a series circuit with said switching element and said coil to develop a first voltage in response to said switching element being rendered conductive;
    a surge current sensing resistor coupled in a parallel circuit including a unidirectionally conducting element with said coil to develop a second voltage in response to said switching element being rendered nonconductive;
    a differential amplifier responsive to said first and second voltages to generate a difference signal;
    a differential integrator having a first input responsive to said control signal and a second input responsive to said difference signal;
    a ramp generator for generating a ramp voltage; and
    a comparator for comparing an output signal from said differential integrator with the instantaneous value of said ramp voltage to provide a pulse to said switching element to render the same conductive.

2. A control circuit as claimed in claim 1, wherein said solenoid-operated actuator comprises a linear solenoid-operated valve.

3. A control circuit as claimed in claim 1, wherein said differential amplifier includes a first voltage dividing network through which one end of said surge current sensing resistor is coupled to ground for applying a divided voltage to a first input of said differential amplifier, and a second voltage dividing network through which the other end of said surge current sensing resistor is coupled to the output of said differential amplifier for applying a divided voltage to a second input of said differential amplifier, each of said first and second voltage dividing networks including a first resistor of identical value and a second resistor of identical value connected in a series circuit.

4. A control circuit as claimed in claim 3, wherein said drive circuit sensing resistor is coupled at one end thereof through a third resistor to said first input of said differential amplifier and coupled at the other end thereof through a fourth resistor to said second input of said differential amplifier, said third and fourth resistors having equal resistance value.

5. A control circuit as claimed in claim 4, wherein the ratio of resistance value of said drive current sensing resistor to said fourth resistor is equal to the ratio of resistance value of said surge current sensing resistor to the first resistor of said second voltage dividing network.

6. A control circuit as claimed in claim 1, wherein said switching element comprises a switching transistor having a collector-emitter path connected in a series circuit with said coil and said drive current sensing resistor and having a base connected to the output of said comparator through an impedance matching element.

7. A control circuit as claimed in claim 1, wherein said ramp generator comprises an operational amplifier having a first input coupled by a feedback resistor to the output of the operational amplifier and a second input coupled by a time constant circuit to the output of the operational amplifier.

8. A control circuit as claimed in claim 1, wherein said differential integrator comprises an operational amplifier having a first input responsive to said control signal and a second input coupled by a capacitor to the output of the operational amplifier and further coupled by a resistor to the output of said differential amplifier.

* * * * *